(12) United States Patent
Eng et al.

(10) Patent No.: US 7,337,762 B2
(45) Date of Patent: Mar. 4, 2008

(54) FUEL ADAPTATION IN A HOMOGENEOUS CHARGE COMPRESSION IGNITION ENGINE

(75) Inventors: James A. Eng, Troy, MI (US); William R. Leppard, Colorado Spring, CO (US); Paul M. Najt, Bloomfield Hills, MI (US); Tang-Wei Kuo, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/538,085

(22) Filed: Oct. 3, 2006

(65) Prior Publication Data
US 2007/0119417 A1 May 31, 2007

Related U.S. Application Data

(60) Provisional application No. 60/724,183, filed on Oct. 6, 2005.

(51) Int. Cl.
*F02B 5/00* (2006.01)
*F02D 41/40* (2006.01)

(52) U.S. Cl. .................... 123/295; 123/305; 123/90.15

(58) Field of Classification Search ................ 123/295, 123/305, 90.15, 90.17; 701/103–105
See application file for complete search history.

(56) References Cited

U.S. PATENT DOCUMENTS

| | | | |
|---|---|---|---|
| 5,967,114 A * | 10/1999 | Yasuoka | 123/295 |
| 6,082,342 A | 7/2000 | Duret | |
| 6,311,667 B1 * | 11/2001 | Satou et al. | 123/295 |
| 6,386,177 B2 | 5/2002 | Urushihara et al. | |
| 6,971,365 B1 | 12/2005 | Najt et al. | |
| 6,994,072 B2 | 2/2006 | Kuo | |
| 7,128,047 B2 | 10/2006 | Kuo | |
| 7,168,409 B2 * | 1/2007 | Fukasawa | 123/90.15 |
| 7,228,839 B2 | 6/2007 | Kuo | |
| 2006/0016423 A1 | 1/2006 | Kuo | |

FOREIGN PATENT DOCUMENTS

| | | | |
|---|---|---|---|
| EP | 0 893 596 A2 * | 1/1999 | |
| JP | 2005-214102 A * | 8/2005 | |
| WO | WO 0146572 | 6/2001 | |
| WO | WO 0146573 | 6/2001 | |

OTHER PUBLICATIONS

Kalghatgi,G;A Method fo Defining Ignition Quality of Fuels in HCCI Engines; May 2003; 20030120; JSAE; Tokyo, Japan.
Risberg, P; Auto-Ignition Quality of Gasoline-like Fules in HCCI Engines; 2003; 2003-01-3215; SAE, Warrendale, PA, USA.
Kalghatgi,G; Fuel Anti-Knock Quality-Part II.Vehicle Studies-How Relevant is Motor Octane Number in Modern Engines?; 2003; 2003-01-3585; SAE, Warrendale, PA, USA.

* cited by examiner

*Primary Examiner*—Hieu T. Vo

(57) ABSTRACT

Operation of a homogeneous charge compression ignition engine is adapted to fuel variations. A variable valve actuating system is employed to effect conditions conducive to homogeneous charge compression ignition operation. Nominal valve timing is selected and adjustments thereto are made based on deviations in combustion phasing from a desired combustion phasing. Fuel delivery timing and quantity are adjusted once valve timing authority limits are reached to achieve further combustion phasing improvement.

18 Claims, 9 Drawing Sheets

FUEL ADAPTATION IN A HOMOGENEOUS CHARGE COMPRESSION IGNITION ENGINE

CROSS-REFERENCE TO RELATED APPLICATIONS

This application claims priority from U.S. Provisional Patent Application No. 60/724,183 filed Oct. 6, 2005, which is hereby incorporated herein by reference.

TECHNICAL FIELD

The present invention is related to operating a four-stroke internal combustion engine.

BACKGROUND OF THE INVENTION

The automotive industry is continually researching new ways of improving the combustion process of the internal combustion engine in an effort to improve fuel economy, meet or exceed emission regulatory targets, and to meet or exceed consumer expectations regarding emissions, fuel economy and product differentiation.

Most modem conventional internal combustion engines attempt to operate around stoichiometric conditions. That is to say providing an optimal air/fuel ratio of substantially 14.6 to 1 that results in substantially complete consumption of the fuel and oxygen delivered to the engine. Such operation allows for exhaust gas aftertreatment by 3-way catalysts which clean up any unconsumed fuel (HC) and combustion byproducts such as nitrogen oxides (NOx) and carbon monoxide (CO). Most modern engines are fuel injected having either throttle body injection (TBI) or multi-port fuel injection (MPFI) wherein each of a plurality of injectors is located proximate an intake port at each cylinder of a multi-cylinder engine. Better air/fuel ratio control is achieved with a MPFI arrangement; however, conditions such as wall wetting and intake runner dynamics limit the precision with which such control is achieved. Fuel delivery precision can be improved by direct in-cylinder injection (DI). So called linear oxygen sensors provide a higher degree of control capability and, when coupled with DI, suggest an attractive system with improved cylinder-to-cylinder air/fuel ratio control capability. However, in-cylinder combustion dynamics then become more important and combustion quality plays an increasingly important role in controlling emissions. As such, engine manufacturers have concentrated on such things as injector spray patterns, intake swirl, and piston geometry to effect improved in-cylinder air/fuel mixing and homogeneity.

While stoichiometric gasoline four-stroke engine and 3-way catalyst systems have the potential to meet ultra-low emission targets, efficiency of such systems lags behind so-called lean-burn systems. Lean-burn systems also show promise in meeting emission targets for NOx through combustion controls, including high exhaust gas dilution and emerging NOx aftertreatment technologies. However, lean-burn systems still face other hurdles, for example, combustion quality and combustion stability particularly at part load operating points and high exhaust gas dilution.

Lean-burn engines, at a most basic level, include all internal combustion engines operated with air in excess of that required for the combustion of the fuel charge provided. A variety of fueling and ignition methodologies differentiate lean-burn topologies. Spark ignited systems (SI) initiate combustion by providing an electrical discharge in the combustion chamber. Compression ignition systems (CI) initiate combustion with combustion chamber conditions including combinations of air/fuel ratio, temperature and pressure among others. Fueling methods may include TBI, MPFI and DI. Homogeneous charge systems are characterized by very consistent and well vaporized fuel distribution within the air/fuel mixture as may be achieved by MPFI or direct injection early in the intake cycle. Stratified charge systems are characterized by less well vaporized and distributed fuel within the air/fuel mixture and are typically associated with direct injection of fuel late in the compression cycle.

Known gasoline DI engines may selectively be operated under homogeneous spark ignition or stratified spark ignition modes. A homogeneous spark ignited mode is generally selected for higher load conditions while a stratified spark ignition mode is generally selected for lower load conditions.

Certain DI compression ignition engines utilize a substantially homogeneous mixture of hot air and fuel and establish pressure and temperature conditions during engine compression cycles that cause ignition without the necessity for additional spark energy. This process is sometimes called controlled auto-ignition or homogeneous charge compression ignition (HCCI). Controlled auto-ignition and HCCI may be used interchangeably. Controlled auto-ignition is a predictable process and thus differs from undesirable pre-ignition events sometimes associated with spark-ignition engines. Controlled auto-ignition also differs from well-known compression ignition in diesel engines wherein fuel ignites substantially immediately upon injection into a highly pre-compressed, high temperature charge of air, whereas in the controlled auto-ignition process the hot air and fuel are mixed together prior to combustion during intake events and generally at compression profiles consistent with conventional spark ignited four-stroke engine systems.

Four-stroke internal combustion engines have been proposed which provide for auto-ignition by controlling the motion of the intake and exhaust valves associated with a combustion chamber to ensure that an air/fuel charge is mixed with combusted gases to generate conditions suitable for auto-ignition without the necessity for externally pre-heating intake air or cylinder charge or for high compression profiles. In this regard, certain engines have been proposed having a cam-actuated exhaust valve that is closed significantly later in the four-stroke cycle than is conventional in a spark-ignited four-stroke engine to allow for substantial overlap of the open exhaust valve with an open intake valve whereby previously expelled combusted gases are drawn back into the combustion chamber early during the intake cycle. Certain other engines have been proposed that have an exhaust valve that is closed significantly earlier in the exhaust cycle thereby trapping combusted gases for subsequent mixing with fuel and air during the intake cycle. In both such engines the exhaust and intake valves are opened only once in each four-stroke cycle. Certain other engines have been proposed having the exhaust valve opened twice during each four-stroke cycle—once to expel combusted gases from the combustion chamber into the exhaust passage during the exhaust cycle and once to draw back combusted gases from the exhaust passage into the combustion chamber late during the intake cycle. These engines variously utilize throttle body, port or direct combustion chamber fuel injection.

However advantageous such lean-bum engine systems appear to be, certain shortfalls with respect to combustion quality and combustion stability, particularly at part load operating points and high exhaust gas dilution, continue to exist. Such shortfalls lead to undesirable compromises including limitations on how much a fuel charge can effectively be reduced during part load operating points while still maintaining acceptable combustion quality and stability characteristics. As a further complicating factor, variations in commercially available fuels can also have pronounced effects upon combustion stability, particularly at low load operating regions.

SUMMARY OF THE INVENTION

A lean-burn, four-stroke, internal combustion engine is generally desirable. Furthermore, such an engine exhibiting high combustion stability at part load operating points is desirable. Moreover, such an engine capable of extended lean operation into heretofore unattained part load operating point regions is desirable.

The present invention relates to a method for robust homogeneous charge compression ignition control using commercially available fully-blended gasoline fuels with wide range of octane qualities. Using combinations of variable valve actuation and fuel injection, the controlled auto-ignition combustion is robust at all engine-operating conditions examined with the present invention.

The present invention provides these and other desirable aspects in a method of operating a four-stroke internal combustion engine with extended capability at low engine loads while maintaining or improving combustion quality, combustion stability and engine out emissions, particularly in light of variability of commercial fuels.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
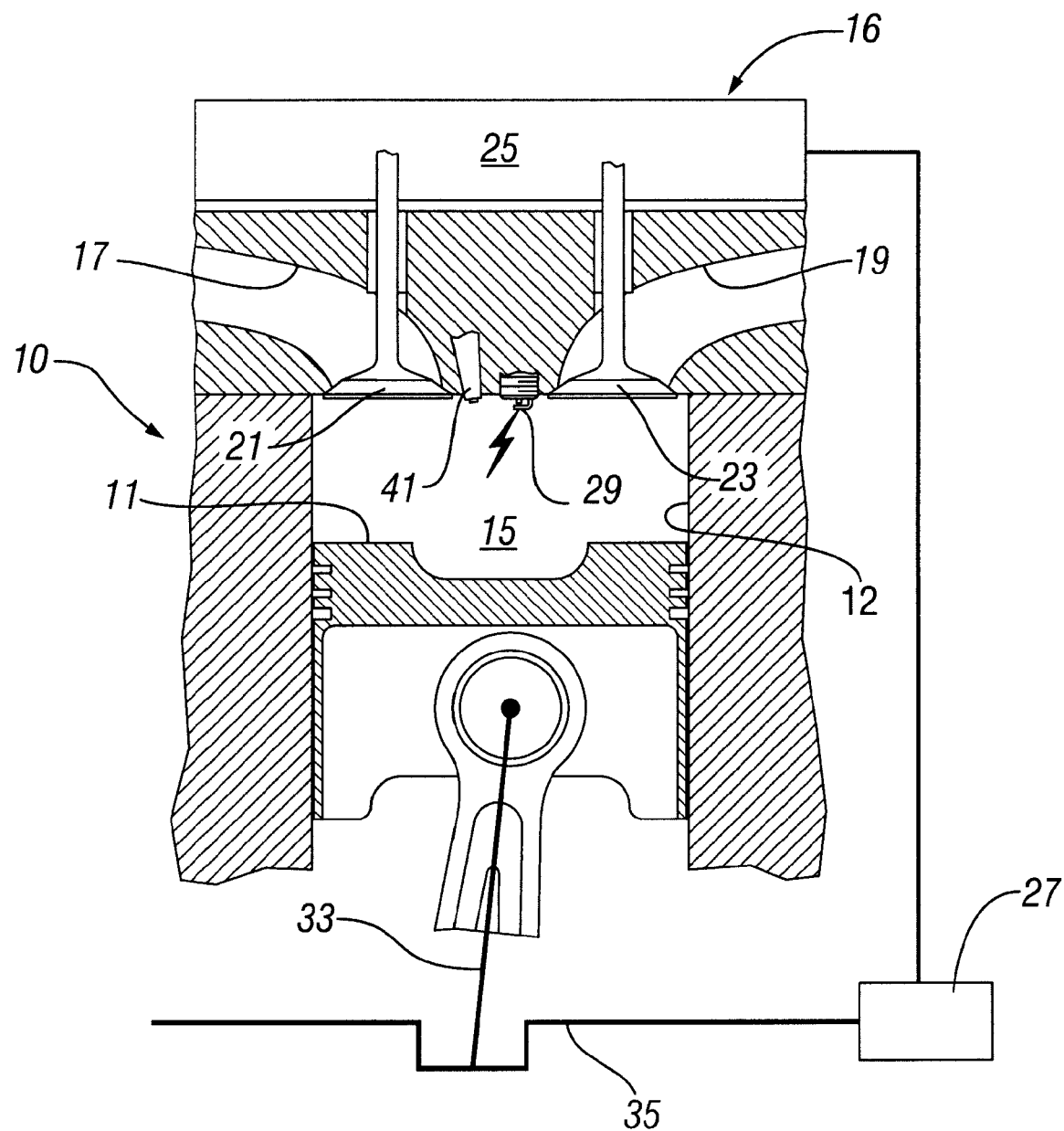
FIG. 1 is a schematic illustration of a single-cylinder, direct-injection, four-stroke internal combustion engine.

With reference first to FIG. 1, an exemplary single cylinder four-stroke internal combustion engine system (engine) 10 suited for implementation of the present invention is schematically illustrated. It is to be appreciated that the present invention is equally applicable to a multi-cylinder four-stroke internal combustion engine. The present exemplary engine 10 is shown configured for direct combustion chamber injection (direct injection) of fuel vis-à-vis fuel injector 41. Alternative fueling strategies including port fuel injection or throttle body fuel injection may also be used in conjunction with certain controlled auto-ignition engines; however, the preferred approach is direct injection. Similarly, while widely available grades of gasoline and light ethanol blends thereof are preferred fuels, alternative liquid and gaseous fuels such as higher ethanol blends (e.g. E80, E85), neat ethanol (E99), neat methanol (M100), natural gas, hydrogen, biogas, various reformates, syngases etc. may also be used in such engines.

With respect to the base engine, a piston 11 is movable in a cylinder 13 and defines therein a variable volume combustion chamber 15. Piston 11 is connected to crankshaft 35 through connecting rod 33 and reciprocally drives or is reciprocally driven by crankshaft 35. Engine 10 also includes valve train 16 illustrated with a single intake valve 21 and a single exhaust valve 23, though multiple intake and exhaust valve variations are equally applicable for utilization with the present invention. Valve train 16 also includes valve actuation apparatus 25 which may take any of a variety of forms including electrically controlled hydraulic or electromechanical actuation (a.k.a. fully flexible valve actuation, FFVA). Alternative valve actuation apparatus adaptable for implementation in conjunction with the present invention include multi-profile cams (a.k.a. multi-lobe, multi-step) and selection mechanisms, cam phasers and other mechanically variable valve actuation technologies implemented individually or in combination. A two-step with dual cam phasing valvetrain suitable for effecting the valve controls disclosed herein includes first exhaust and intake cams for effecting nominal duration and lift profiles, second exhaust and intake cams for effecting more limited duration and lift profiles and dual, independent cam phasers. Intake passage 17 supplies air into the combustion chamber 15. The flow of the air into the combustion chamber 15 is controlled by intake valve 21 during intake events. Combusted gases are expelled from the combustion chamber 15 through exhaust passage 19 with flow controlled by exhaust valve 23 during exhaust events. Spark plug 29 is used to enhance the ignition timing control of the engine at certain conditions (e.g. during cold start and near the low load operation limit). Also, it has proven preferable to rely on spark ignition near the high part-load operation limit under controlled auto-ignition combustion and during high speed/load operating conditions with throttled or non-throttled SI operation.

Engine control is provided by computer based control 27 which may take the form of conventional hardware configurations and combinations including powertrain controllers, engine controllers and digital signal processors in integrated or distributed architectures. In general, control 27 includes at least one microprocessor, ROM, RAM, and various I/O devices including A/D and D/A converters and power drive circuitry. Control 27 also specifically includes controls for valve actuation apparatus 25, fuel injector 41 and spark plug 29. Controller 27 includes the monitoring of a plurality of engine related inputs from a plurality of transduced sources including engine coolant temperature, outside air temperature, manifold air temperature, operator torque requests, ambient pressure, manifold pressure in throttled applications, displacement and position sensors such as for valve train and engine crankshaft quantities, cylinder pressure, exhaust gas constituents and further includes the generation of control commands for a variety of actuators as well as the performance of general diagnostic functions. Known cylinder pressure sensors may sense combustion pressure directly, e.g. via intrusive or non-intrusive pressure sensors, or indirectly e.g. via ion sensing or crankshaft torque. While control and power electronics associated with valve actuation apparatus 25, fuel injector 41 and spark plug 29 may be integral with control 27, such may also be incorporated as part of distributed smart actuation scheme wherein certain monitoring and control functionality related to respective subsystems are implemented by programmable distributed controllers associated with such respective valve, fuel control and spark subsystems.

A total of 7 different fuels (designated as Fuel A to Fuel G) were tested using the exhaust recompression valve strategy at three different load conditions of 5.5, 8.0 and 14 mg/cycle. The three fueling/loads cover all three HCCI combustion modes: lean with split injection as disclosed for example in commonly assigned U.S. Pat. No. 6,971,365 B 1, lean with single injection as disclosed for example in commonly assigned U.S. Ser. No. 10/899,457 (2006/0016423), and stoichiometric with split injection as disclosed for example in commonly assigned U.S. Pat. No. 6,994,072 B2.

It is well known and accepted that Research and Motor Octane Numbers (RON and MON) alone do not adequately describe knocking (auto-ignition) behavior of commercial fuels in traditional spark-ignition engines. A combination of them, (RON+MON)/2, called octane number, however, was used in common practice to rank the anti-knock quality of a practical fuel.

In 2001, Kalghatgi of Shell Research proposed an octane index (OI) to better describe the fuels knocking behavior in accordance with the following relationships.

$$OI=RON-K*S \text{ where } S \text{ (sensitivity)}=RON-MON \quad (1)$$

or $$OI=(1-K)RON+K\ MON \quad (2)$$

Kalghatgi showed good linear correlation between knock-limited spark advance and OI in a single cylinder engine, and acceleration times and OI in knock sensor equipped vehicles.

In 2003, Kalghatgi extended his K factor analysis to HCCI engines showing good correlation between CA50 and OI at the following engine conditions.

CR=16.7 and 13.6,
PIVC=1 & 2 bar,
several TIVC,
several lambdas,
4 speeds,
11 different fuels, and
K values ranged from −1.90 to 0.41.

In 2003, Kalghatgi extended his K factor analysis further to include Shell's HCCI engine running at higher intake temperatures and included more "gasoline" like fuels. The following engine conditions correspond to this engine.

Single cylinder,
PFI,
fixed cams,
no EGR,
CR=14.0,
PIVC=1 bar,
3 TIVC,
several lambdas,
3 speeds, and
12 different fuels (4-PRF's, 3-toluene/hexane blends, 4-refinery blending components, one fully blended gasoline).

In summary, according to Kalghatgi's "K" factor analysis, the auto-ignition quality of a practical fuel can be correlated using the octane index, OI=RON−K*(RON−MON) where RON and MON are the Research and Motor Octane Numbers. K is a constant depending only on the pressure and temperature variation in the engine and varies with engine design parameter such as compression ratio. K decreases as the compression temperature in the unburned gas at a given pressure in the engine decreases and can be negative if this temperature is lower than in the RON test.

A four-stroke, single cylinder, 0.55 liter, controlled auto-ignition, gasoline direct injection internal combustion engine was utilized in implementing the valve and fueling controls and acquisition of the various data embodied herein. Unless specifically discussed otherwise, all such implementations and acquisitions are assumed to be carried out under standard conditions as understood by one having ordinary skill in the art.

Figure 2:
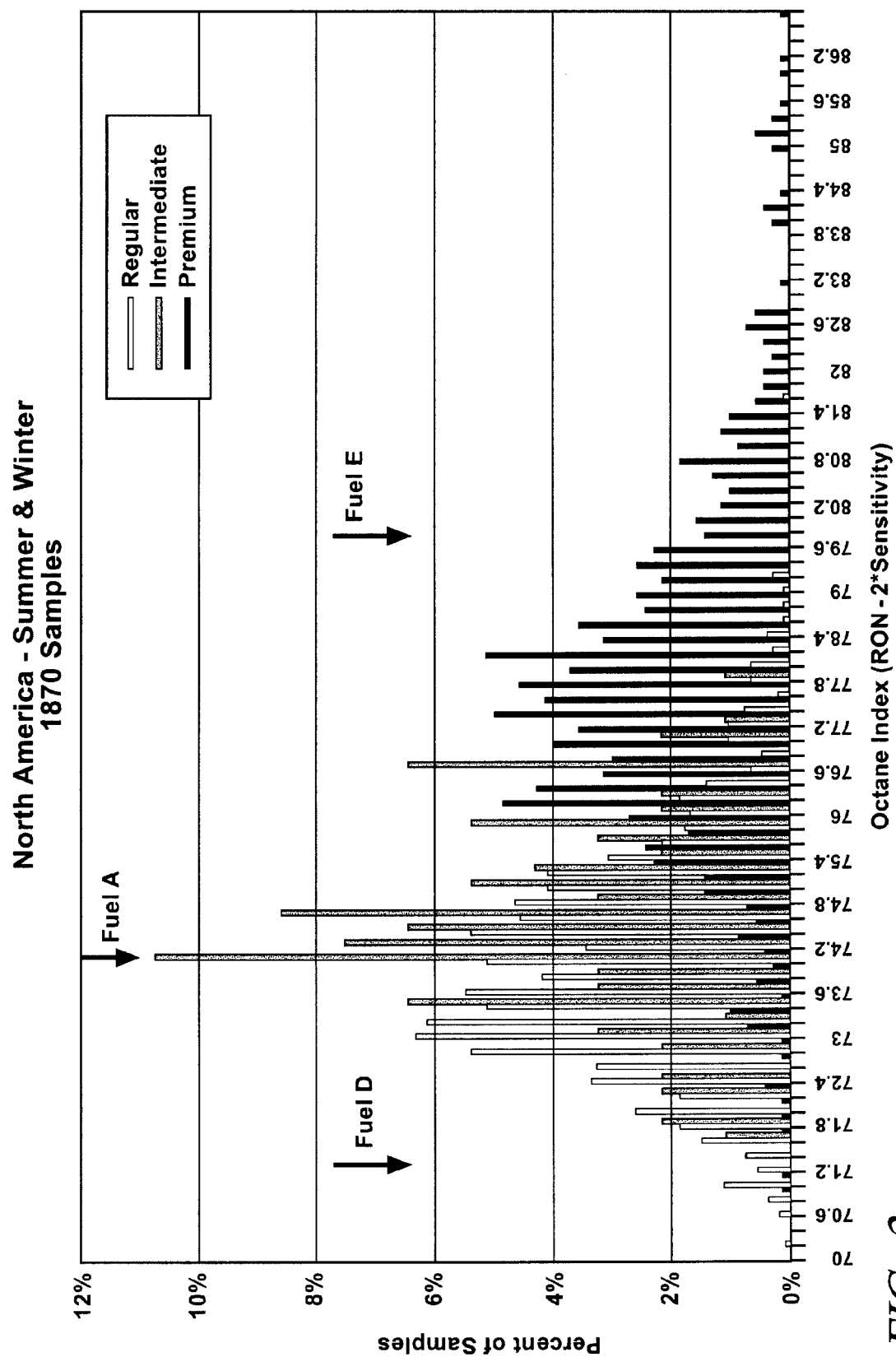
FIG. 2 illustrates percent of samples as a function of OI with K=2.0 for regular, intermediate, and premium gasoline fuels in North America including summer and winter periods.

Having thus described the environment and certain application hardware suitable for implementing the present invention, attention is now directed toward FIG. 2. FIG. 2 shows the plot of percent of North America sampled fuels including during summer and winter periods against octane index (OI=RON−K*(RON−MON)) with K=2 (The reason for choosing 2 will be explained later). A total of 1870 samples were collected that includes regular, intermediate, and premium grade gasoline. Our test fuels, Fuel D, Fuel A, and Fuel E are indicated which covered wide OI range of the sampled fuels.

Figure 3:
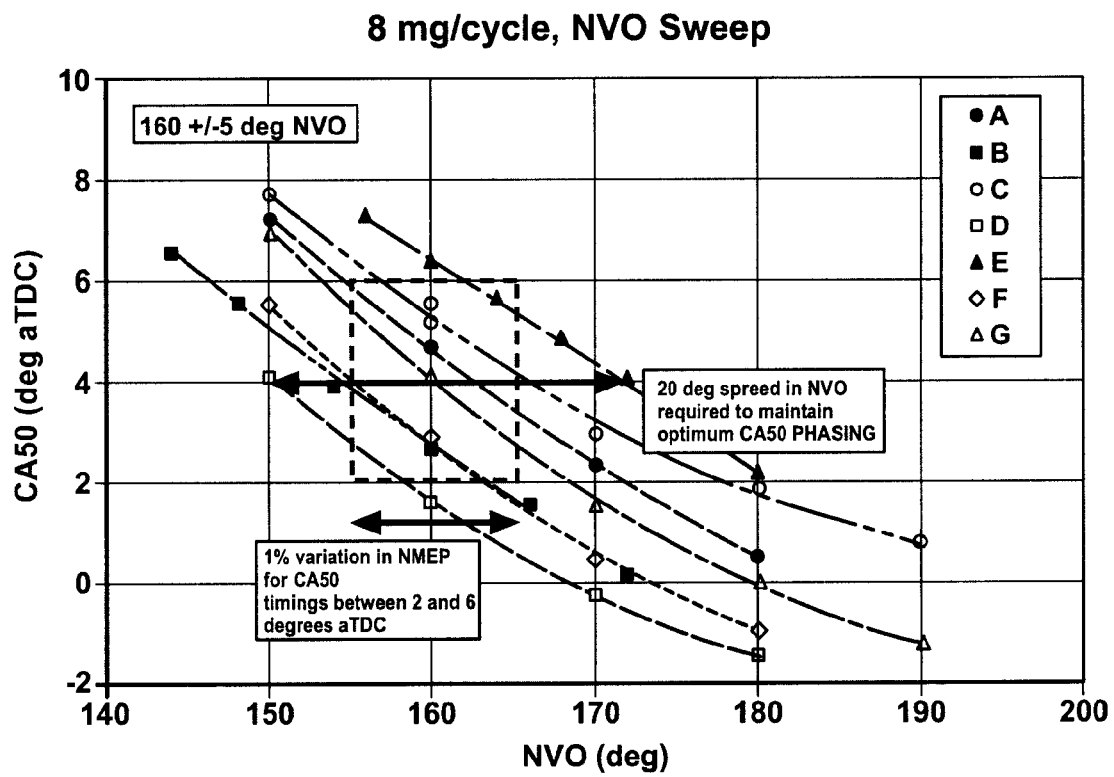
FIG. 3 illustrates crank angle position of 50% burned (CA50) versus NVO for the test fuels at 8 mg/cycle during NVO sweep.

FIG. 3 shows the variations in CA50 as a function of NVO for all the test fuels at 8 mg/cycle. It can be seen from the figure that CA50 advances near linearly with increasing NVO. In particular, a 20-degree-increase in NVO resulted in 4-degree-advance in CA50. In addition, our base fuel, Fuel A, shows a CA50-NVO relationship representative of the average of all fuels tested.

Further, for fixed CA50, ±10 degrees spread in NVO is observed for all the fuels tested. In other words, a NVO authority of ±10 degrees centered at NVO=160 deg. is sufficient in maintaining the optimal combustion phasing at 8 mg/cycle independent of fuel.

Figure 4:
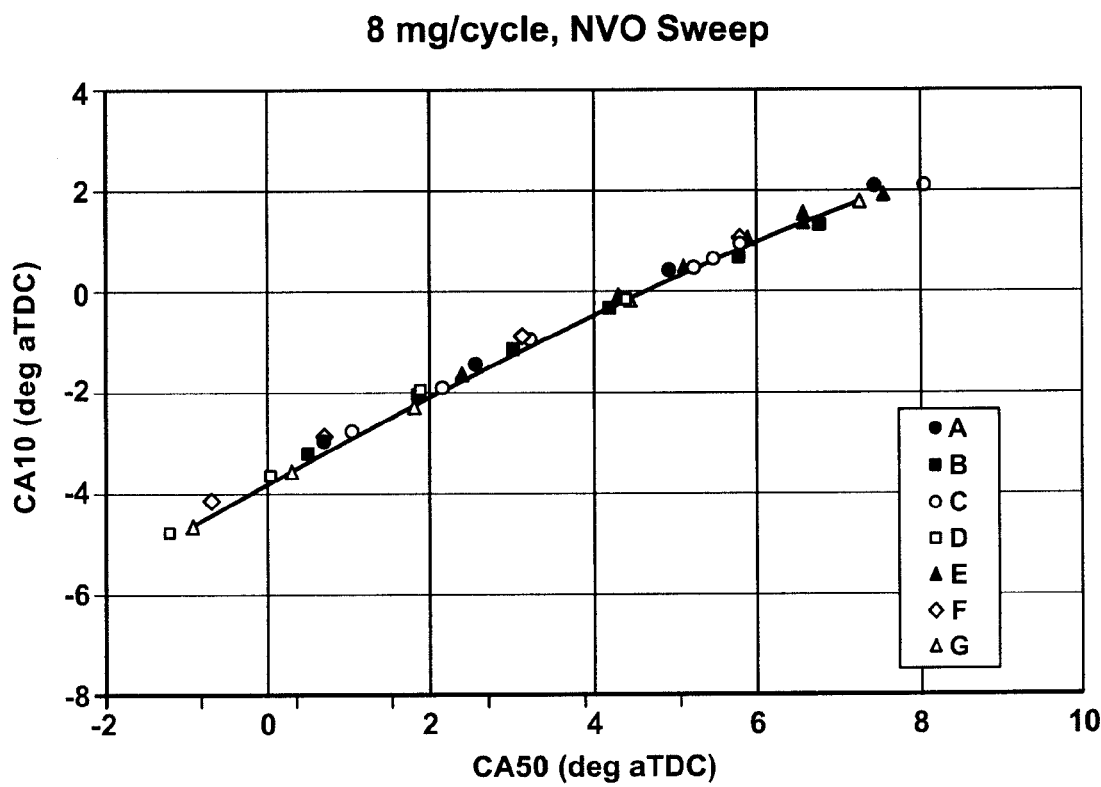
FIG. 4 illustrates a plot of crank angle position of 10% burned (CA10) against crank angle position of 50% burned (CA50) for the test fuels at 8 mg/cycle during NVO sweep.
Figure 5:
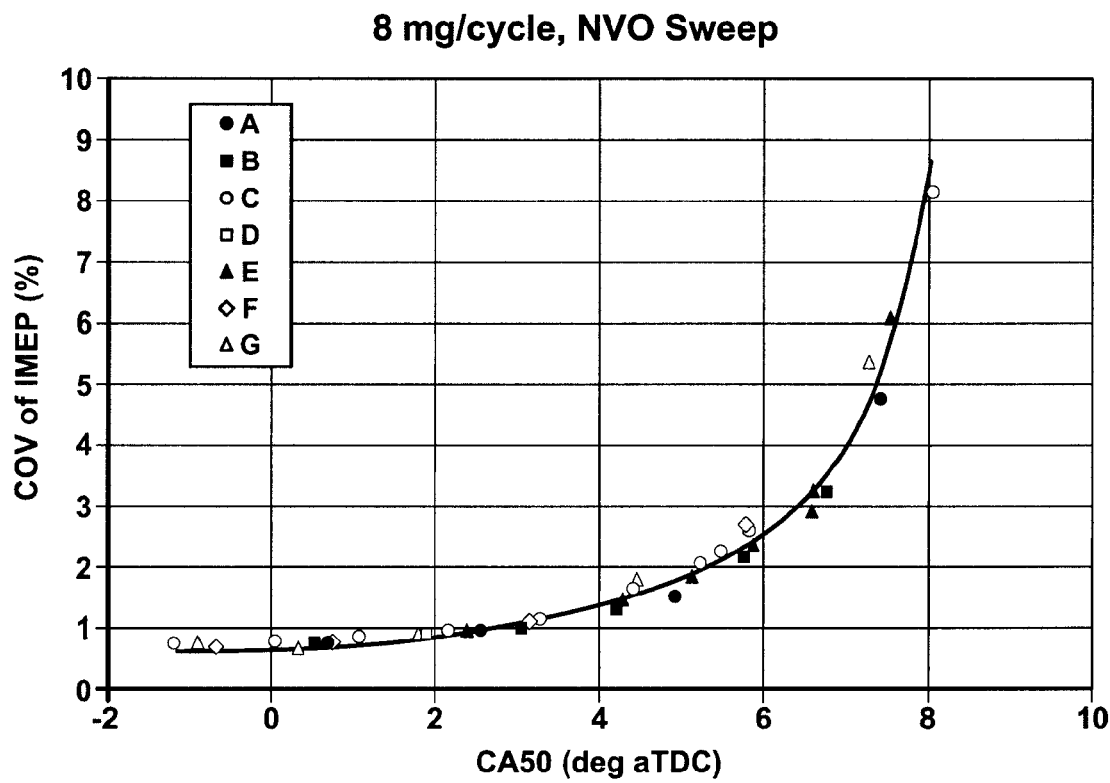
FIG. 5 illustrates COV of IMEP versus crank angle position of 50% burned (CA50) for the test fuels at 8 mg/cycle during NVO sweep.
Figure 6:
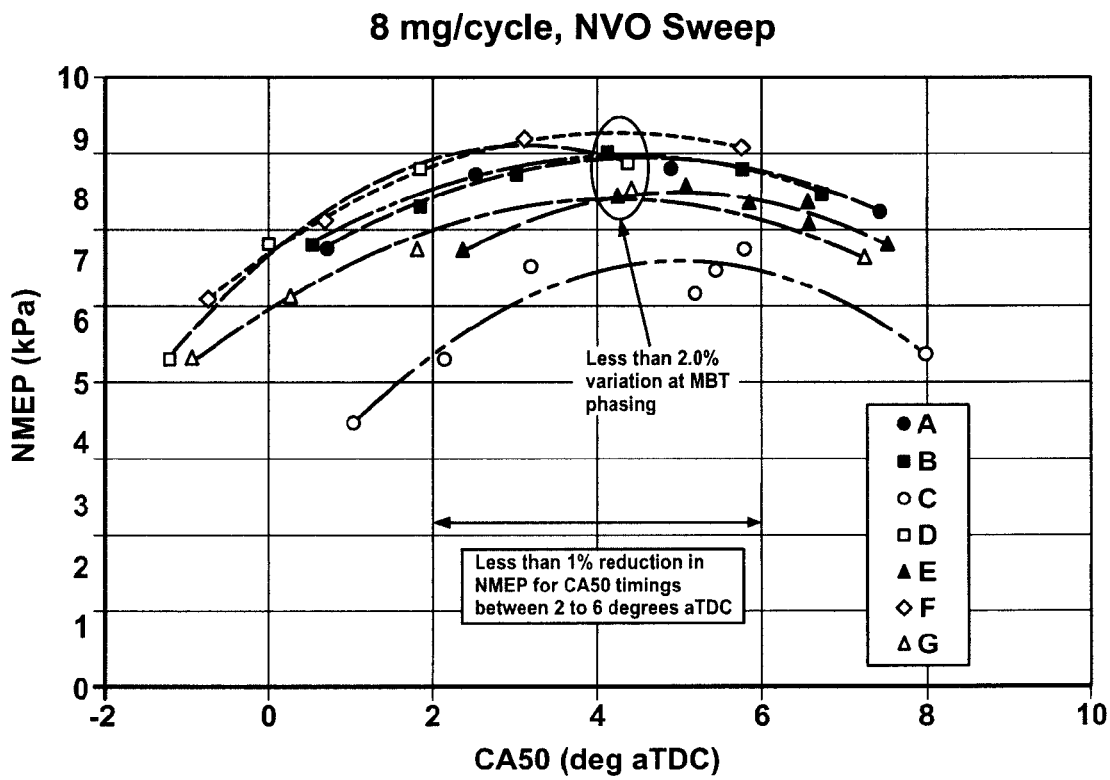
FIG. 6 illustrates measured Net Mean Effective Pressure (NMEP) versus crank angle position of 50% burned (CA50) for the test fuels at 8 mg/cycle during NVO sweep.

When all the performance and emissions data are plotted against the crank angle position of 50% mass burned (CA50), they collapsed into a single curve irrespective of the test fuels used. Typical examples are shown in FIGS. 4-6 for CA10, COV of IMEP, and NMEP, respectively. In particular, ±2 degrees variations in CA50 centered about the optimal value at 4 degrees aTDC results in less than 1% reduction in NMEP. In other words, the change in NMEP with CA50 is minimal for combustion phasings near the optimal value. Thus, for practical applications, a 10 degrees NVO spread (160±5 degrees) is sufficient in order to control NMEP within 1%

Figure 7:
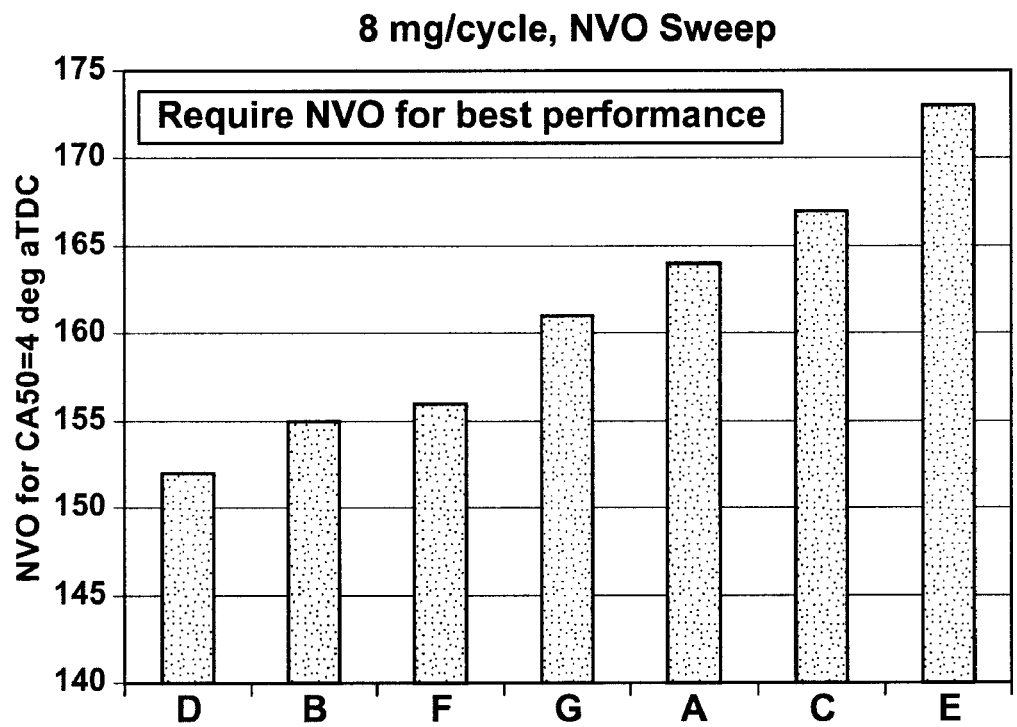
FIG. 7 illustrates NVO requirement for all the fuels tested at 8 mg/cycle such that CA50 is maintained at 4 degrees after top dead center (aTDC) combustion.

The required NVO for optimal combustion phasing at 4 degrees aTDC combustion is shown in FIG. 7 for all the test fuels. It can be seen from the figure that Fuel E has the most stringent NVO requirement.

Figure 8:
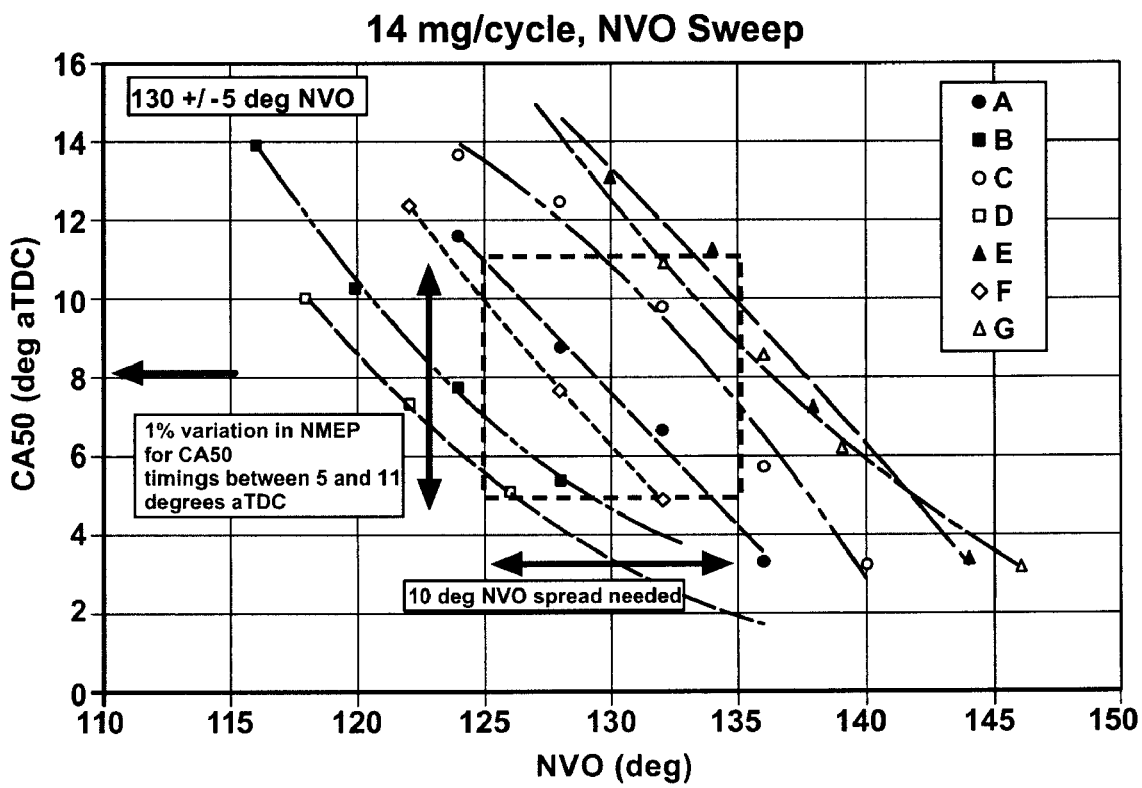
FIG. 8 illustrates crank angle position of 50% burned (CA50) versus NVO for the test fuels at 14 mg/cycle during NVO sweep.

FIG. 8 shows the variations in CA50 as a function of NVO for all the test fuels at a fuel level of 14 mg/cycle. It can be seen from the figure that: 1) CA50 advances near linearly with increasing NVO. In particular, 10 degrees increase in NVO resulted in 6 degrees advance in CA50. The sensitivity between CA50 and NVO is higher for 14 mg/cycle than 8 mg/cycle. 2) For fixed CA50 at 8 degrees aTDC, ±7 degrees spread in NVO is observed for all the fuels tested. 3) A NVO authority of ±7 degrees is needed to account for all the test fuel tested.

Figure 9:
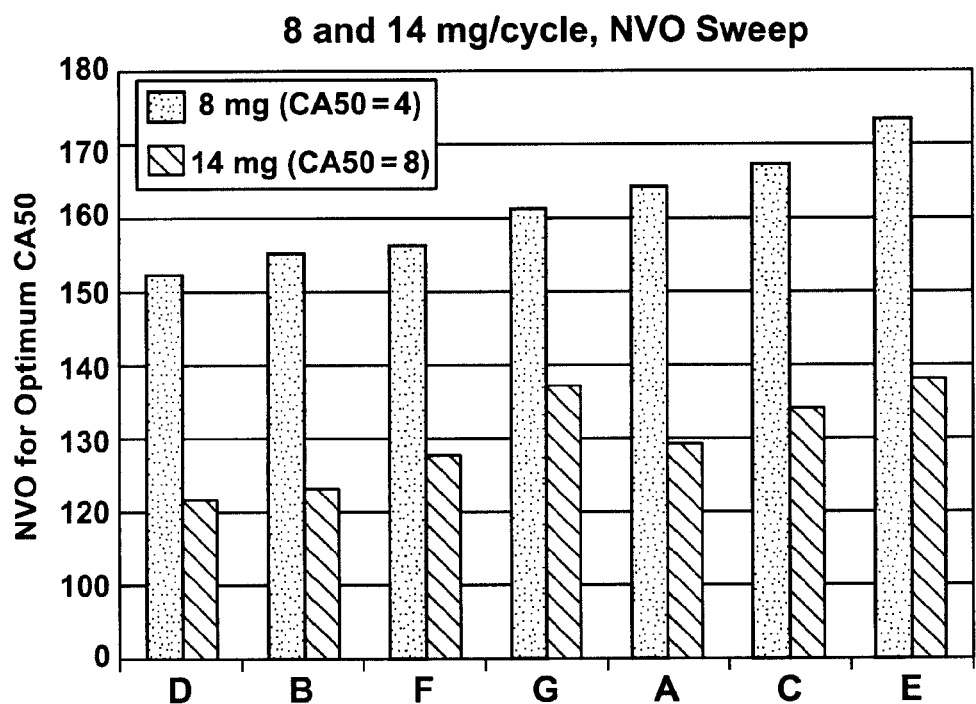
FIG. 9 illustrates NVO requirement for optimal CA50 of all the fuels tested at 8 and 14 mg/cycle.
Figure 10:
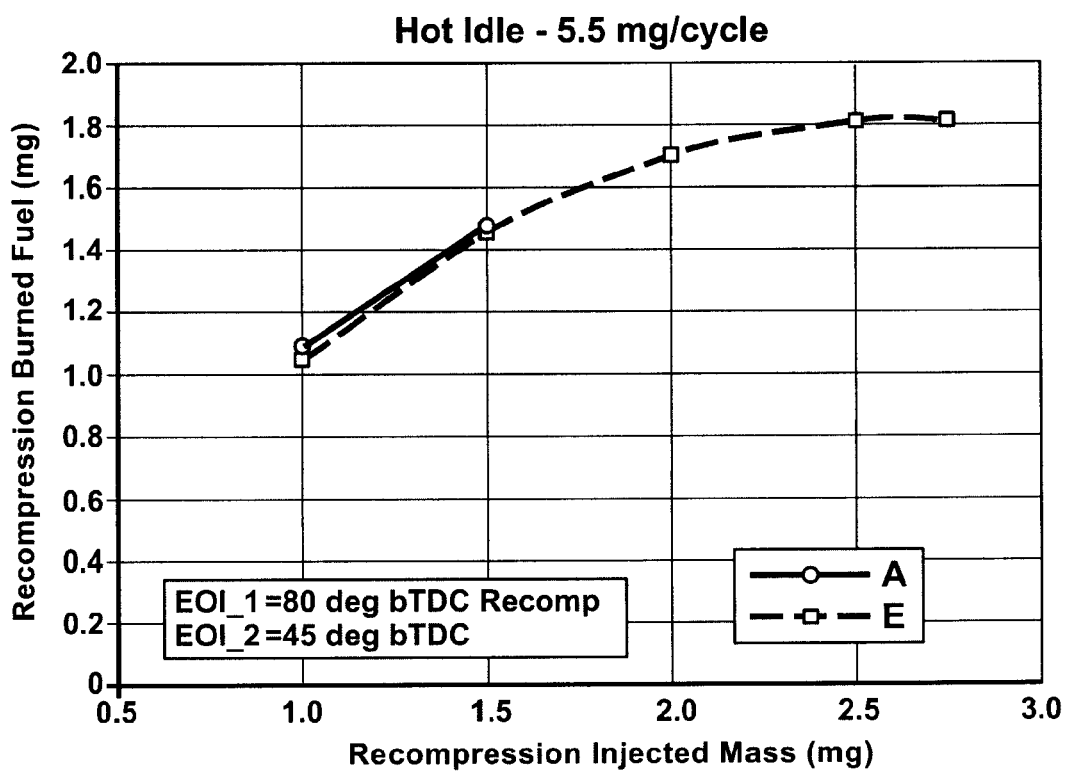
FIG. 10 illustrates recompression burned fuel as a function of recompression injected mass for both Fuel A and Fuel E at hot idle—5.5 mg/cycle.

The required NVO for optimal CA50 is shown in FIG. 9 for all the test fuels at 8 and 14 mg/cycle test points. In general, the fuels with higher required NVO at 8 mg/cycle demand higher NVO at 14 mg/cycle as well. Further, a consistent relationship exists between the NVO requirements at 8 and 14 mg/cycle in order to maintain best combustion phasing and hence engine performance. Knowing the required changes at one fueling level will be sufficient to make the necessary changes at all fueling levels. Among all the fuel tested at 8 mg/cycle, Fuel E requires the largest NVO to reach optimal combustion phasing at 4 degrees aTDC. It is about 175 degrees (FIG. 7) which is very close to the upper limit of hydraulic cam phaser operation of 190 degrees. To mitigate the requirement on NVO for combustion phasing control, Fuels A and E were used for injection strategy study to demonstrate the effectiveness of using injection timing and quantity for combustion phasing control. To this end, both single and split injection strategies were evaluated. In particular, FIG. 10 shows that the recompression burned fuel increases with increasing recompression injected fuel, which resulted in higher mixture gas temperature during compression and hence combustion phasing advance. However, its effectiveness decreases with increasing recompression injected fuel beyond 2 mg.

The Applicants have resolved the above results to suggest the following procedure for steady-state HCCI engine combustion phasing control to account for fuel variations between 7 and 15 mg/cycle (180-450 kPa NMEP).

1. A nominal NVO is selected first depending on the load level (FIG. 9).
2. Desired CA50 is then specified.
3. Adjust NVO +/−5 deg. as required to maintain CA50 within target range with different fuels.
4. At the NVO limits adjust reforming fueling level as required to maintain CA50 within target window.

Figure 11:
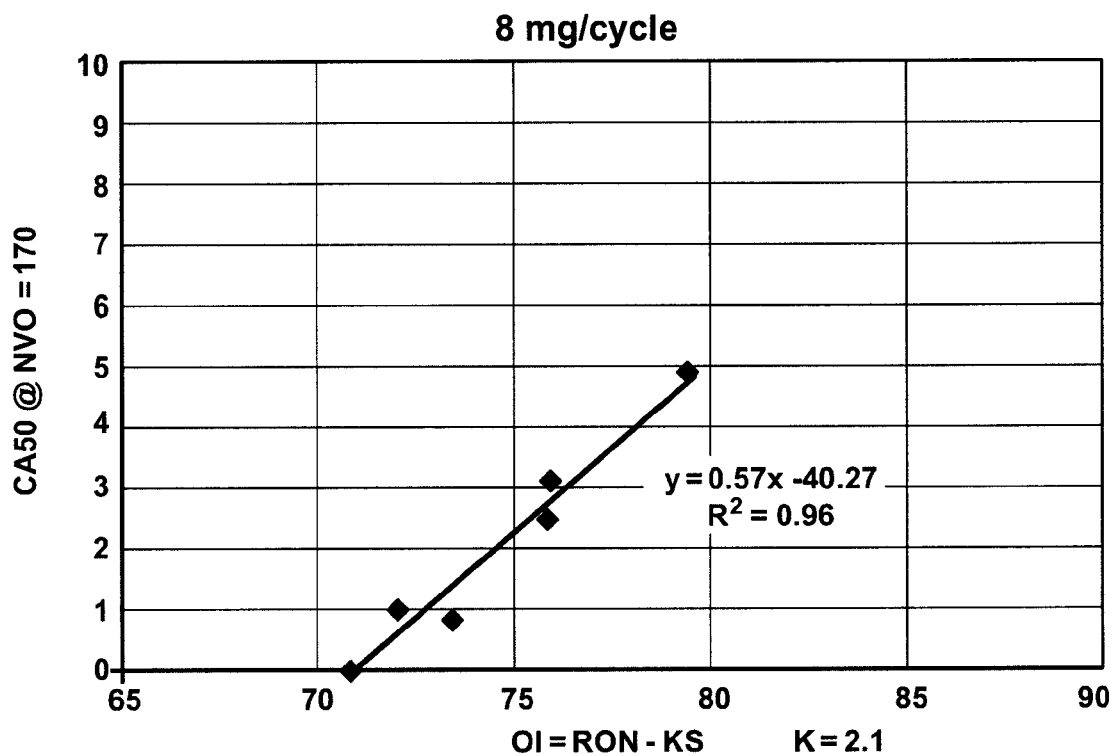
FIG. 11 illustrates CA50 @ NVO=170 deg. as a function of octane index (OI) with K=2.1 for all the test fuels at 8.0 mg/cycle.
Figure 12:
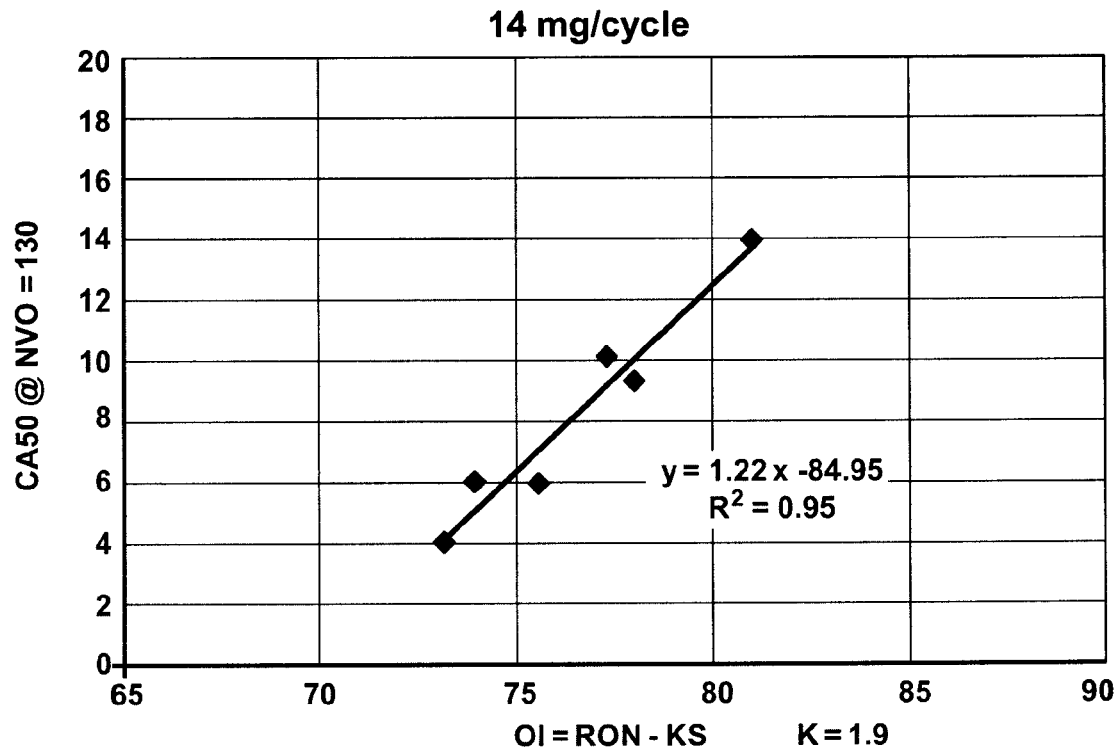
FIG. 12 illustrates CA50 @ NVO=130 deg. as a function of OI with K=1.9 for all the test fuels at 14 mg/cycle.

FIG. 11 shows the experimentally measured CA50 @ NVO=170 for all test fuels at 8 mg/cycle versus OI using k=2.1. Good linear correlation between CA50 and OI is demonstrated. The same is true for the 14 mg/cycle test point. FIG. 12 shows our measured CA50 @ NVO=130 for all test fuels at 14 mg/cycle versus OI using k=1.9. By comparing FIG. 12 to FIG. 11, it is clear from both figures that different correlations exist for different loads. However, it is also clear from both figures that our data are well correlated by a single Kalghatgi K factor (~2) at different loads.

The CA50—OI correlations shown in FIG. 11 and FIG. 12 are useable to predict how commercially available, fully-blended gasoline fuels (with known RON and MON) will behave in our HCCI engine. For example, using RON and MON of the fuel and a K valve equals 2, the CA50 can be calculated at 8 mg/cycle using the following relationship.

$$CA50=0.44OI-30.9 \quad (3)$$

Eq. (3) differs slightly from the correlation shown in FIG. 11 due to the use of a slightly different K value. The NVO required in order to move the CA50 back to its optimal location (4 degrees aTDC) is calculated using the following relationship at 8 mg/cycle which is derived based on Fuel A data shown in FIG. 3.

$$NVO=182-4.35CA50 \quad (4)$$

Since higher octane indices (OI) equate to delayed HCCI combustion phasing, fuels with higher octane indices will be challenging. Further, since OI=RON−2*Sensitivity, fuels with high RON and low Sensitivity will be the most challenging.

Figure 13:
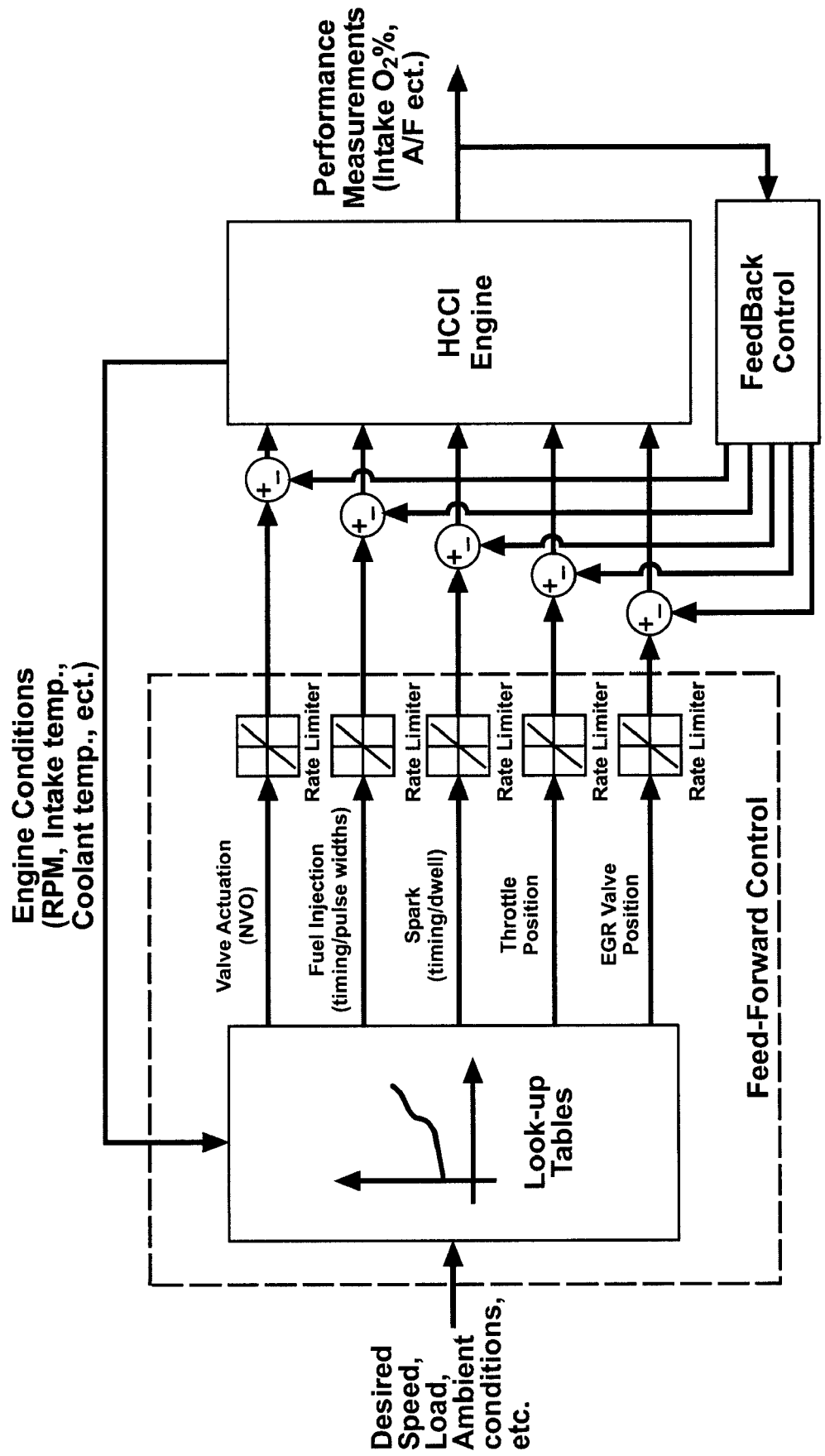
FIG. 13 illustrates a schematic control diagram with which robust controlled auto-ignition combustion is maintained with variations in fuel octane qualities.

FIG. 13 illustrates schematically a control methodology for HCCI engine combustion phasing control to compensate for fuel variations substantially as follows.

1. Primary load control parameter is NVO.
2. Lookup table for NVO as function of load at fully warmed-up condition.
3. Use combustion phasing (for example, LPP or CA50) as closed loop feedback signal.
4. Compare CA50 from each cylinder to target CA50 value from lookup table.
5. If cylinders are randomly dispersed around target CA50, then use secondary control parameters (for example, injection timing/quantity during recompression, spark timing, etc.) to trim cylinders.
6. If ALL of the cylinders are displaced from target value then this indicates a shift in fuel "octane index".
7. Use either NVO or secondary control parameters (for example, injection timing/quantity during recompression, spark timing, etc.) to adjust engine average CA50 and update tables based on change in required NVO using relationship (4).

Figure 14:
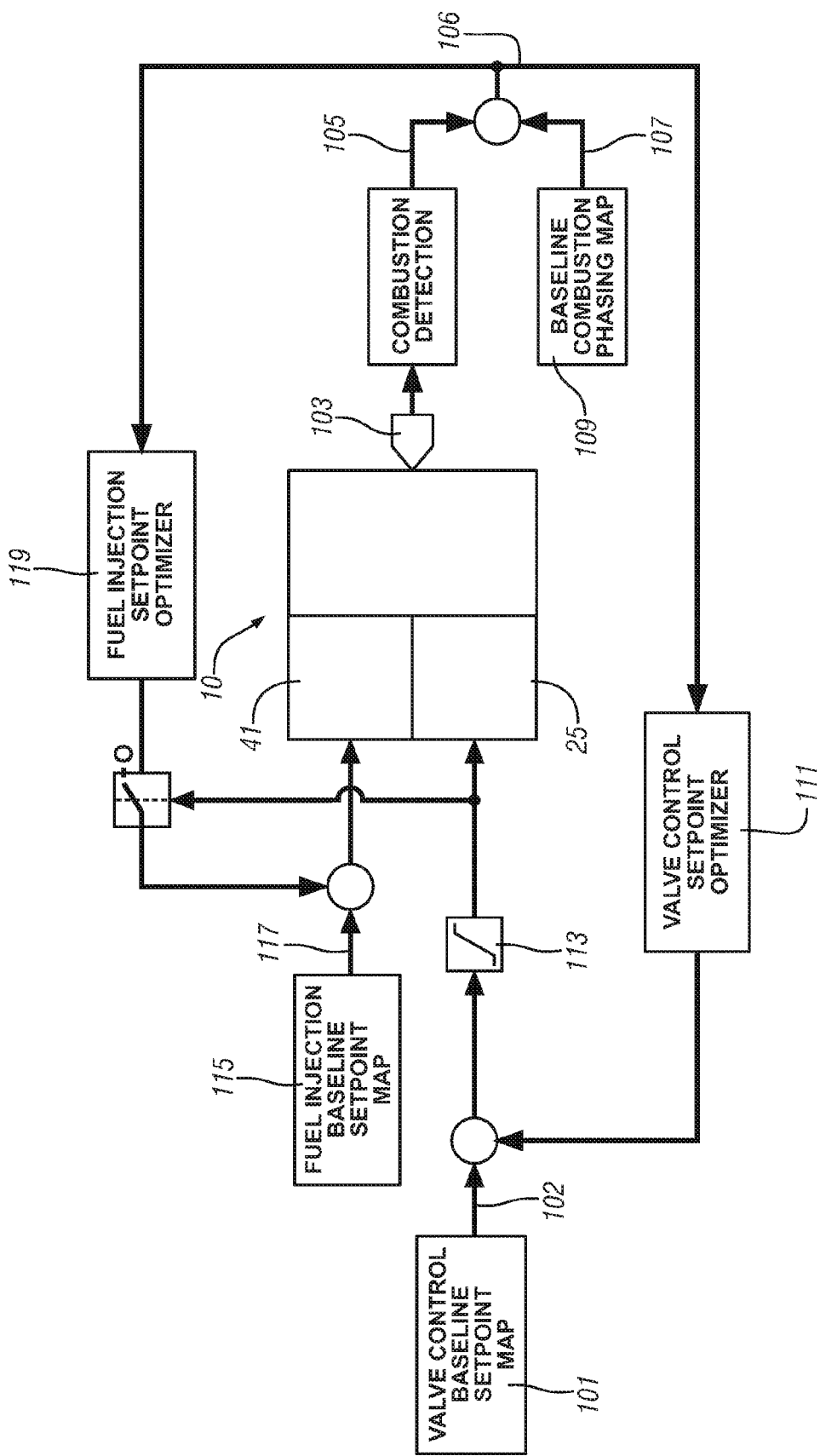
FIG. 14 schematically illustrates a preferred embodiment of a control scheme utilizing valve control and fuel timing/quantity control to effect desired combustion phasing in the presence of fuel variability in accordance with the present invention.

With reference to FIG. 14, a more specific exemplary control schematic is illustrated. Engine 10 includes fuel injectors 41 and valve actuation apparatus 25. An open-loop portion of the control including Valve Control Baseline Set-point Map 101 is preferably calibrated offline through known dynamometric techniques. This open-loop control may comprise, for example, tabulated intake and exhaust valve positions as stored in calibration tables referenced by engine speed and load data. It is these nominal valve positions that are used to establish baseline negative valve overlap NVO 102. In accordance with an embodiment, engine 10 is additionally configured with one or more cylinder pressure sensors 103. The control system is structured including a closed-loop portion to adjust the nominal valve positions based on combustion information 105 derived from cylinder pressure sensors 103. NVO correction uses combustion phasing feedback information 105 (e.g. % burned angle, heat release rate, combustion duration, maximum rate of pressure rise, just to name a few) and compares it to a combustion phasing target 107, e.g. from Baseline Combustion Phasing Map 109. This comparison perturbs the nominal valve positions from Valve Control Baseline Setpoint Map 101 to drive the combustion phasing error 106 input to Valve Control Set-point Optimizer 111 to zero. Limiter 113 limits the authority over valve adjustments in accordance with the particular hardware limitations of the engine including the valve actuation apparatus 25. Hence, the control establishes negative valve overlap through intake and exhaust valve actuations that effect minimal error in predefined combustion phasings up to the limitations of the valve actuation apparatus.

Valve position targets and combustion phasing targets are referenced, for example, using engine speed and load data. Additional correction may be afforded in accordance with intake temperature, ambient pressure, fuel type, etc. Baseline Combustion Phasing Map 109 is preferably calibrated offline through known dynamometric techniques. Baseline combustion phasing targets represent desired combustion characteristics relative to a plurality of metrics (e.g. NOx emissions, combustion noise, fuel economy, and maximum MBT at dilution/knock limits for gasoline applications). The closed loop portion of the control maintains the desired combustion characteristics in the presence of variations and disturbances including variations in the fuel being provided to the engine. The Valve Control Set-point Optimizer 111 in one implementation is a slow integrator. In other words, the Valve Control Set-point Optimizer 111 slowly increases or decreases the valve set-points if the achieved NVO (combustion phasing feedback) 105 is less or more than expected.

Exemplary information 105 may correspond substantially to 50% fuel burned, e.g. crank angle of 50% fuel burned (CA50). Information 105 may correspond, for example, to an average across all cylinders, to a single cylinder, or to a bank of cylinders in accordance with the available engine cylinder pressure sensing hardware configuration and cost considerations. And, with respect to valve actuation hardware which is limited in its individual cylinder-to-cylinder adjustment capability (i.e. cam phasers), the NVO is necessarily established consistently for each of the individual cylinders. For this reason, other cylinder-to-cylinder combustion variability factors may result in cylinder-to-cylinder variability in the combustion phasings. Generally, therefore, it is with respect to a single NVO setting applicable to all cylinders that the average combustion phasing across all cylinders results in a minimal average deviation from the desired phasing. Independently actuatable valves (i.e. fully flexible valve actuation) may allow for individual cylinder-to-cylinder adjustments of NVO in accordance with respective cylinder pressure sensing. Still, deviation of the average combustion phasing across all cylinders from desired combustion phasing is minimized. As mentioned earlier, all of this is accomplished within the boundaries of the valve actuation apparatus authority.

At the limits of valve actuation apparatus authority, a secondary combustion phasing control more particularly adaptable to individual cylinder-to-cylinder variations is preferably implemented. For example, fuel injection timing in a direct injection fuel apparatus may be controlled on a cylinder to cylinder basis. In FIG. 14, another open-loop portion of the control including Fuel Injection Control Baseline Set-point Map 115 is preferably calibrated offline through known dynamometric techniques. This open-loop control may comprise, for example, tabulated fuel injection timing as stored in calibration tables referenced by engine speed and load data. It is these nominal fuel injection timings that are used to establish baseline fuel injection timings 117. In accordance with the secondary combustion phasing control, and preferably in accordance with limits in the valve actuation authority of the valve position control as illustrated (or alternatively in accordance with minimal combustion phasing having been satisfied by the valve control), a closed-loop control portion adjusts the timings or the mass of reforming fuel based on combustion information 105 derived from cylinder pressure sensors 103. Fuel injection timing correction uses combustion phasing feedback information 105 and compares it to the combustion phasing target 107. This comparison perturbs the nominal fuel injection timings from Fuel Injection Control Baseline Set-point Map 115 to drive the error input to Fuel Injection Control Set-point Optimizer 119 to zero. Hence, the secondary combustion phasing control establishes fuel injection timing that further trims the combustion phasing error 106. An alternative secondary combustion phasing control may be implemented in similar fashion utilizing spark timing controls at least in operating regions wherein spark assist is utilized and normal spark authority ranges can effect the desired combustion phasing shifts. Combustion phasing of all cylinders may be adjusted, for example via a shift of all injection timings, or each individual cylinder's combustion phasing may be adjusted, for example via cylinder-to-cylinder fuel injection optimizations. The latter implementation may benefit from the utilization of individual or per-cylinder combustion sensing.

NVO has been shown an effective parameter for HCCI engine combustion phasing control from 7 mg/cycle to 15 mg/cycle to account for fuel variations. Below 7 mg/cycle, the NVO is preferably changed for combustion stability and emissions considerations and the combustion phasing is controlled primarily by recompression injected fuel mass and timing. Octane index (OI) correlations (FIGS. 11 and 12) can be used to predict how commercially available, fully-blended gasoline fuels will behave under HCCI operation within a wide load range. In particular, with known RON and MON, OI can be calculated using K=2. The CA50 can then be calculated using the relationship (3) herein above. The NVO requirement to move CA50 back to its optimal location (substantially about 4 degrees aTDC) is calculated using the relationship (4) herein above.

The present invention has been described with respect to certain preferred embodiments and variations herein. Other alternative embodiments, variations ad implementations may be implemented and practiced without departing from the scope of the invention which is to be limited only by the claims as follow:

The invention claimed is:

1. Control for a direct-injection, four-stroke, internal combustion engine including variable volume combustion chambers defined by pistons reciprocating within cylinders between top-dead center and bottom-dead center points and variably actuatable intake and exhaust valves comprising:
   a first open-loop control providing nominal negative valve overlap settings; and
   a first closed-loop control providing adjustments to said nominal negative valve overlap settings based on deviations of combustion phasing from desired combustion phasing.

2. The control as claimed in claim 1 further comprising:
   a second open-loop control providing nominal recompression fuel injection settings; and
   a second closed-loop control providing adjustments to said nominal recompression fuel injection settings based on deviations of combustion phasing from desired combustion phasing.

3. The control as claimed in claim 2 wherein said recompression fuel injection settings comprise at least one of timing and mass.

4. The control as claimed in claim 2 wherein said second closed-loop control is effective when predetermined valve adjustment limits are reached.

5. The control as claimed in claim 2 wherein said second closed-loop control is effective when further valve adjustments fail to reduce deviations in combustion phasing from desired combustion phasing.

6. Method for operating a direct-injection, four-stroke, internal combustion engine including variable volume combustion chambers defined by pistons reciprocating within cylinders between top-dead center and bottom-dead center points and variably actuatable intake and exhaust valves comprising:
   controlling the intake and exhaust valves to a nominal negative valve overlap; and,
   adjusting the intake and exhaust valves from the nominal negative valve overlap based on deviations in combustion phasing from desired combustion phasing.

7. The method as claimed in claim 6 further comprising adjusting recompression fuel injection timing based on deviations in combustion phasing from the desired combustion phasing when predetermined valve adjustment limits are reached.

8. The method as claimed in claim 6 further comprising adjusting recompression fuel injection timing based on deviations in combustion phasing from the desired combustion phasing when further valve adjustments fail to reduce deviations in combustion phasing from desired combustion phasing.

9. The method as claimed in claim 6 further comprising adjusting recompression fuel injection mass based on deviations in combustion phasing from the desired combustion phasing when predetermined valve adjustment limits are reached.

10. The method as claimed in claim 6 further comprising adjusting recompression fuel injection mass based on deviations in combustion phasing from the desired combustion phasing when further valve adjustments fail to reduce deviations in combustion phasing from desired combustion phasing.

11. The method of claim 6, further comprising determining a fuel octane index based upon the deviations in combustion phasing from desired combustion phasing.

12. Control apparatus for an internal combustion engine having intake and exhaust valves, comprising:
   variable valve actuation apparatus;
   pressure sensor apparatus for providing combustion chamber pressure information; and
   a control module adapted for controlling said variable valve actuation apparatus to effect a predetermined first setpoint for negative valve overlap between the exhaust and intake valves, and for adjusting the predetermined first setpoint based on a comparison of combustion phasing information derived from said pressure sensor apparatus to a predetermined second setpoint for combustion phasing information.

13. The control apparatus for an internal combustion engine as claimed in claim 12 further comprising:
   fuel injection apparatus;
   said control module further adapted for controlling said fuel injection apparatus to effect a predetermined third setpoint comprising at least one of fuel injection timing and mass, and for adjusting the predetermined third setpoint based on the comparison of combustion phasing information.

14. The control apparatus of claim 12, further comprising the control module adapted to determine a fuel octane index based upon the comparison of combustion phasing information derived from said pressure sensor apparatus to the predetermined second setpoint for combustion phasing information.

15. Method for operating a multi-cylinder internal combustion engine configured with variable valve actuation apparatus and fuel delivery apparatus, comprising:
   closed-loop controlling said variable valve actuation apparatus in accordance with predetermined setpoints and feedback based on combustion phasing information; and
   closed-loop controlling said fuel delivery apparatus in accordance with predetermined recompression fuel injection setpoints and feedback based on combustion phasing information.

16. The method as claimed in claim 15 wherein said recompression fuel injection setpoints comprise at least one of timing and mass.

17. The method as claimed in claim 15 wherein closed-loop controlling said fuel delivery apparatus is effective when predetermined valve adjustment limits are reached.

18. The method as claimed in claim 15 wherein closed-loop controlling said fuel delivery apparatus is effective when further valve adjustments fail to reduce deviations in combustion phasing from desired combustion phasing.

* * * * *